(12) United States Patent
Turner et al.

(10) Patent No.: US 11,001,368 B2
(45) Date of Patent: May 11, 2021

(54) WING STRUCTURE FOR AN AIRCRAFT

(71) Applicant: UNITED STATES OF AMERICA AS REPRESENTED BY THE ADMINISTATOR OF NASA, Washington, DC (US)

(72) Inventors: Travis L. Turner, Yorktown, VA (US); James B. Moore, Yorktown, VA (US); David L. Long, Newport News, VA (US); Henry H. Haskin, Victor, MT (US); Albert R. Allen, Yorktown, VA (US); David P. Lockard, Hampton, VA (US); Craig L. Streett, Virginia Beach, VA (US); Mehdi R. Khorrami, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 393 days.

(21) Appl. No.: 16/158,595

(22) Filed: Oct. 12, 2018

(65) Prior Publication Data
US 2019/0112029 A1 Apr. 18, 2019

Related U.S. Application Data

(60) Provisional application No. 62/571,315, filed on Oct. 12, 2017.

(51) Int. Cl.
*B64C 9/22* (2006.01)
*B64C 9/02* (2006.01)
*B64C 9/24* (2006.01)
*B64C 9/34* (2006.01)
*B64C 3/50* (2006.01)

(52) U.S. Cl.
CPC .............. *B64C 9/02* (2013.01); *B64C 3/50* (2013.01); *B64C 9/24* (2013.01); *B64C 9/34* (2013.01)

(58) Field of Classification Search
CPC ............... B64C 9/24; B64C 9/26; B64C 9/34
See application file for complete search history.

(56) References Cited

U.S. PATENT DOCUMENTS

| | | | | |
|---|---|---|---|---|
| 2,755,039 A | * | 7/1956 | Davie, Jr. | ............... B64C 9/24 244/187 |
| 6,286,790 B1 | * | 9/2001 | Thorpe | ..................... B64C 9/22 244/214 |
| 6,394,396 B2 | * | 5/2002 | Gleine | ................... B64D 15/04 244/198 |
| 6,457,680 B1 | * | 10/2002 | Dobrzynski | .............. B64C 9/24 244/210 |
| 6,789,769 B2 | | 9/2004 | Mau et al. | |

(Continued)

OTHER PUBLICATIONS

Khorrami, M. R., Berkman, M. E., and Choudhari, M., "Unsteady Flow Computations of a Slat with a Blunt Trailing Edge," AIAA Journal, vol. 38, No. 11, 2000, pp. 2050-2058.

(Continued)

*Primary Examiner* — Philip J Bonzell
*Assistant Examiner* — Michael B. Kreiner
(74) *Attorney, Agent, or Firm* — M. Bruce Harper; Andrea Z. Warmbier; Helen M. Galus (57) ABSTRACT

Wing structure that includes slat-cove fillers configured to reduce leading-edge slat noise on aircraft, such as transport aircraft.

16 Claims, 9 Drawing Sheets

(56) References Cited

U.S. PATENT DOCUMENTS

| | | | |
|---|---|---|---|
| 7,766,281 B2* | 8/2010 | Lorkowski | B64C 3/50 244/215 |
| 8,424,810 B1* | 4/2013 | Shmilovich | B64C 9/22 244/214 |
| 8,469,316 B2* | 6/2013 | Hirai | B64C 9/24 244/214 |
| 8,695,925 B2 | 4/2014 | Khorrami et al. | |
| 9,242,720 B2* | 1/2016 | Turner | B64C 3/48 |
| 2012/0097791 A1 | 4/2012 | Turner et al. | |
| 2015/0056453 A1 | 2/2015 | Kang et al. | |
| 2016/0137284 A1 | 5/2016 | Turner et al. | |
| 2020/0346735 A1* | 11/2020 | Dos Reis | B64C 3/38 |

OTHER PUBLICATIONS

Singer, B. A., Lockard, D. P., and Brentner, K. S., "Computational Aeroacoustic Analysis of Slat Trailing-Edge Flow," AIAA Journal, vol. 38, No. 9, 2000, pp. 1558-1564.

Khorrami, M. R., Singer, B. A., and Berkman, M. E., "Time-accurate Simulations and Acoustic Analysis of Slat Free Shear Layer," AIAA Journal, vol. 40, No. 7, 2002, pp. 1284-1291.

Khorrami, M. R., Singer, B. A., and Lockard, D. P., "Time-accurate Simulations and Acoustic Analysis of Slat Free Shear Layer: Part II," AIAA Paper 2002-2579, 2002.

Choudhari, M., Khorrami, M. R., Lockard, D. P., Atkins, H. L., and Lilley, G. M., "Slat Cove Noise Modeling: A Posteriori Analysis of Unsteady RANS Simulations," AIAA Paper 2002-2468, 2002.

Streett, C. L., Casper, J. H., Lockard, D. P., Khorrami, M. R., Stoker, R. W., Elkoby, R., Wenneman, W. F., and Underbrink, J. R., "Aerodynamic Noise Reduction for High-Lift Devices on a Swept Wing Model," AIAA Paper 2006-212, 2006.

Imamura, T., Ura, H., Yokokawa, Y., Enomoto, S., Yamamoto, K., and Hirai, T., "Designing of Slat Cove Filler as a Noise Reduction Device for Leading-edge Slat," AIAA Paper 2007-3473, 2007.

Otsuka, K. and Wayman, C. M. (Editors), Shape Memory Materials, Cambridge University Press, Cambridge, UK. 1998, pp. 1, 2, 27-28.

Lagoudas, D. C. (Editor), Shape Memory Alloys: Modeling and Engineering Applications, Springer Science+Business Media, LLC, New York, NY, 2008, p. 10.

Lacy, Doug S. and Sclafani, Anthony J.: "Development of the High Lift Common Research Model (HL-CRM): A Representative High Lift Configuration for Transonic Transports," AIAA 2016-0308, AIAA SciTech 2016 Forum, San Diego, CA, Jan. 4-8, 2016.

Benafan, O.; Brown, J.; Calkins, F. T.; Kumar, P.; Stebner, A. P.; Turner, T. L.; Vaidyanathan, R.; Webster, J.; and Young, M. L.: "Shape Memory Alloy Actuator Design: CASMART Collaborative Best Practices and Case Studies," International Journal of Mechanics and Materials in Design (2014), 10(1) 1-42, doi: 10.1007/s10999-013-9227-9.

Kang, J. H.; Siochi, E. J.: Penner, R. K.; and Turner, T. L.: "Enhanced Adhesive Strength between Shape Memory Polymer Nanocomposite and Titanium Alloy," Composites Science & Technology, 96 (2014) 23-30.

Smith, N. A.; Antoun, G. G.; Ellis, A. B.; and Crone, W. C.: "Improved adhesion between nickel-titanium shape memory alloy and a polymer matrix via silane coupling agents." Compos A Appl. Sci. 35(11), 1307-1312 (2004).

Scholten, W. D.; Hartl, D. J.; and Turner, T. L.: "Analysis-Driven Design Optimization of a SMA-Based Slat-Cove Filler for Aeroacoustic Noise Reduction," Proc. ASME 2013 Conf. on Smart Matl., Adaptive Struct. and Intell. Sys., SMASIS2013-3104, Snowbird, UT, Sep. 16-18, 2013.

Scholten, W. D.; Hartl, D. J.; and Turner, T. L.: "Development and Analysis-Driven Optimization of a Superelastic Slat-Cove Filler for Airframe Noise Reduction," AIAA Journal, 54(3) 1074-1090, Mar. 2016, doi: 10.2514/1.J054011.

Niu, M. C. Y., "Airframe Structural Design" Conmilit Press Ltd., Jan. 1989, p. 327.

H. Ozcan, H.; Ma, Ji; Wang, S. J.; Karaman, I.; Chumlyakov, Y.; Brown, J.; and Noebe, R. D.: "Effects of cyclic heat treatment and aging on superelasticity in oligocrystalline Fe—Mn—Al—Ni shape memory alloy wires," Scripta Materialia, 134 (2017) 66-70.

Sreekantamurthy, T; Turner, T. L.; Moore, J. B.; and Su, J: "Elastomeric Structural Attachment Concepts for Aircraft Flap Noise Reduction—Challenges and Approaches to Hyperelastic Structural Modeling and Analysis," AIAA-2014-0509, AIAA SciTech 2014 Forum, National Harbor, Maryland, Jan. 13-17, 2014.

* cited by examiner

WING STRUCTURE FOR AN AIRCRAFT

CROSS-REFERENCE TO RELATED PATENT APPLICATION(S)

This patent application claims the benefit of and priority to U.S. Provisional Patent Application No. 62/571,315, filed on Oct. 12, 2017, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Airframe noise produced by unsteady air flow around aircraft structures is a significant source of aircraft noise during landing approach. Conventional leading-edge slat devices for high-lift are one such prominent source of airframe noise. Concepts for various devices, such as slat-cove fillers, have been proposed in an attempt to explore reductions in the noise associated with leading-edge slats. However, improvements in such devices, especially slat-cove fillers, are need to achieve practical implementation of noise reduction for leading-edge slats.

BRIEF SUMMARY OF THE INVENTION

Methods, systems and devices of the various embodiments may provide slat-cove fillers configured to reduce leading-edge slat noise on aircraft, such as transport aircraft. Various embodiments may provide advancements in slat-cove fillers and various embodiments may be applicable to any aircraft that employs a leading-edge, high lift device that is distinct from the primary (or main) wing structure. Various embodiments promote a tight nesting between the leading-edge slat and the primary wing structure in the retracted position. Various embodiments avoid significant variation across the span-wise sections of the various leading-edge slats or compromises in the slat-cove filler profile by shortening the effective curvilinear length of the slat-cove filler when stowed while enabling the stowage of an optimized slat-cove filler having a large actual curvilinear length. Various embodiments provide a sliding-flexure-hinge at the bottom of the leading-edge slat-cove wall that allows the slat-cove filler to slide into and out of an interior of the leading-edge slat.

Various embodiments may provide a wing structure for an aircraft including a primary wing structure, a leading-edge slat, and a slat-cove filler. The leading-edge slat may include a cove wall, a sliding-flexure-hinge extending from the cove wall, and an interior space within the leading-edge slat, wherein the leading-edge slat is configured to movably interconnect with the primary wing structure for movement between a retracted position and a deployed position. The slat-cove filler may include a flexible material and define a first shape when the leading-edge slat is in the deployed position and a second shape when the leading-edge slat is in the retracted position. A leading end of the slat-cove filler may be configured to slide along the sliding-flexure-hinge into the interior space when the leading-edge slat is moving toward the deployed position and out of the interior space when the leading-edge slat is moving toward the retracted position.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 2A:
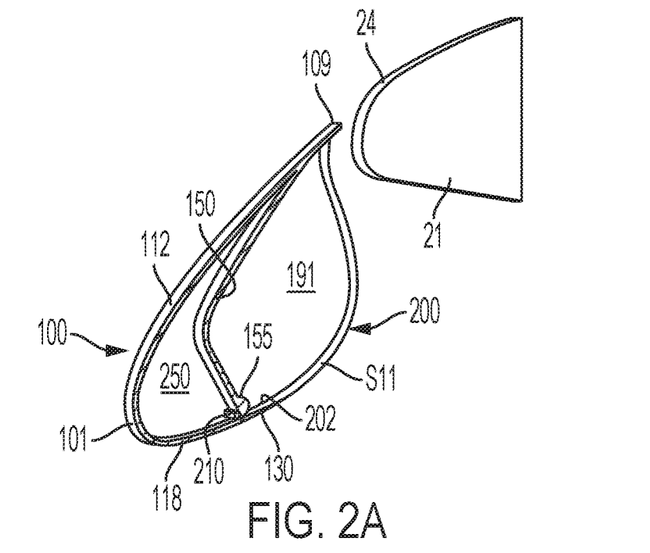
FIG. 2A is a partially fragmentary isometric view of a portion of a primary wing structure, a leading-edge slat with a sliding-flexure-hinge, and a sliding slat-cove filler, wherein the leading-edge slat is in a deployed position, in accordance with various embodiments.
Figure 2B:
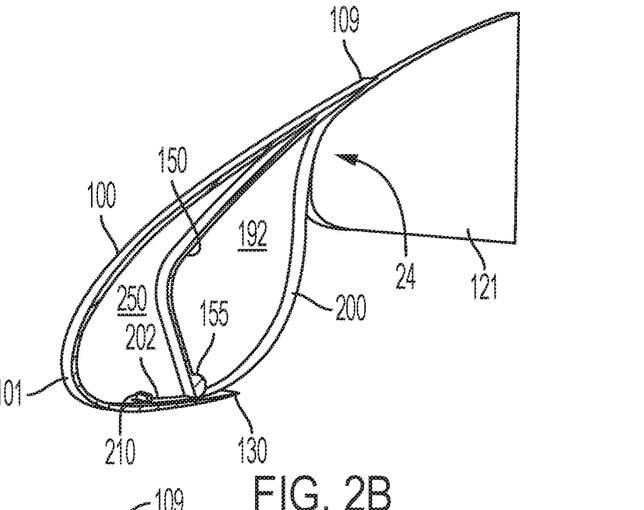
FIG. 2B is a partially fragmentary isometric view of a portion of the primary wing structure, leading-edge slat, and sliding slat-cove filler of FIG. 2A, wherein the leading-edge slat is in a configuration that is between a deployed position and a retracted position, in accordance with various embodiments.
Figure 2C:
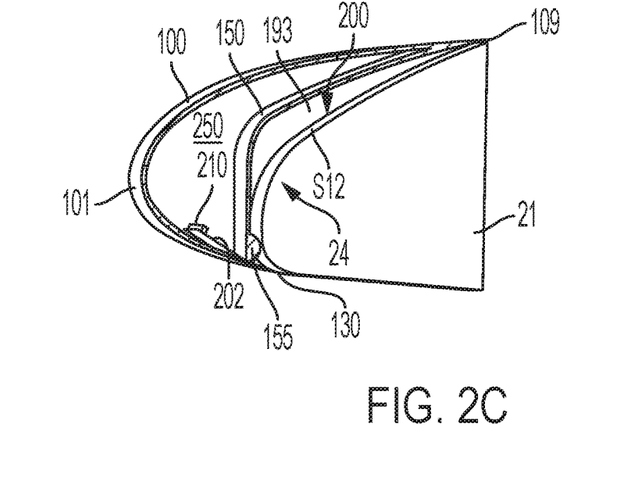
FIG. 2C is a partially fragmentary isometric view of a portion of the primary wing structure, leading-edge slat, and sliding slat-cove filler of FIGS. 2A-2B, wherein the leading-edge slat is in the retracted position, in accordance with various embodiments.
Figure 2D:
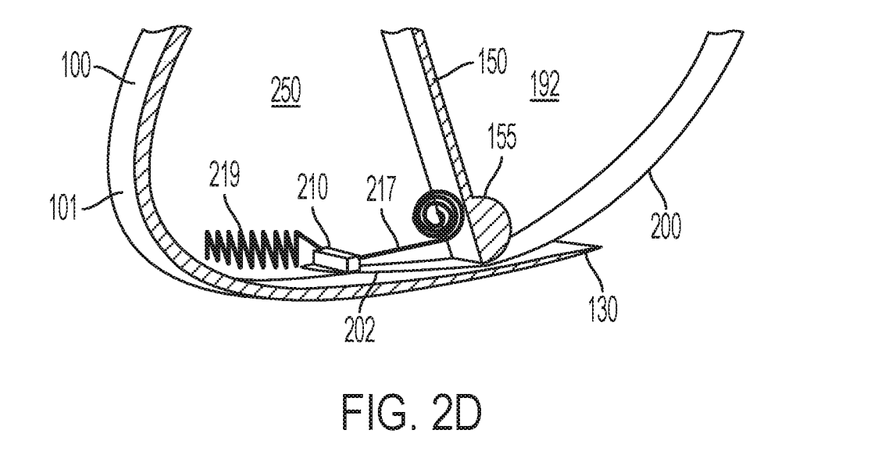
FIG. 2D is a partially fragmentary isometric zoomed-in view of a sub-portion of the leading-edge slat and sliding slat-cove filler of FIG. 2B including an optional bias element, wherein the leading-edge slat is in a configuration that is between a deployed position and a retracted position, in accordance with various embodiments.

For purposes of description herein, the terms "upper," "lower," "right," "left," "rear," "rearwardly," "front," "forward," "chord-wise," "span-wise," "vertical," "horizontal," and derivatives thereof shall relate to the invention as oriented in FIGS. 2A-2C. However, it is to be understood that the invention may assume various alternative orientations and step sequences, except where expressly specified to the contrary. For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

A conventional wing assembly, as illustrated in FIGS. 1A-1D, includes a primary wing structure 21 and a conventional leading-edge slat 22 positioned adjacent and forward of a leading-edge 24 of the primary wing structure 21. In the orientation shown in FIGS. 1A-1D, air 5 flows from left to right (e.g., against a direction of flight), such that a forward direction faces left and a rearward direction faces right. The primary wing structure 21 may comprise a known aircraft wing having a leading-edge 24, a trailing edge (not shown), an upper surface, and a lower surface. The upper and lower surfaces of the primary wing structure 21 extend between the leading and trailing edges to define a first airfoil element.

The conventional leading-edge slat 22 may include an upper surface, a lower surface, and a cove wall 42 extending between the upper and lower surfaces on the back side of the conventional leading-edge slat 22. The upper surface of the conventional leading-edge slat 22 extends rearwardly toward the primary wing structure 21 from a leading edge 51 to a slat trailing edge 25. The lower surface of the conventional leading-edge slat 22 extends rearwardly from the leading edge 51 to a cusp 26 (i.e., a pointed end where two curves meet). The conventional leading-edge slat 22 may be movably interconnected with the primary wing structure 21 by various known mechanisms. Such mechanisms shift/rotate the conventional leading-edge slat 22 between a deployed position (FIG. 1A) and a retracted position (FIG. 1D). The mechanisms may deploy or retract the conventional leading-edge slat 22 relative to the primary wing structure 21 when activated.

In flight, the conventional leading-edge slat 22 and the primary wing structure 21 together split the flow of air 5 at a stagnation point on a leading edge 51 of the conventional leading-edge slat 22. In this way, the flow of air 5 splits at the leading edge 51 and flows over an upper surface and under a lower surface of the conventional leading-edge slat 22. Vortical re-circulating flows, form in a cove region 35 behind a cove wall 42 of the conventional leading-edge slat 22, and may cause significant unsteady fluctuating flow, generating noise. In addition, the vortical re-circulating flows may cause the air that is forced through the gap between the leading-edge 24 of the primary wing structure 21 and the slat trailing edge 25 of the conventional leading-edge slat 22 to become unsteady, which may also be a source of airframe noise. Thus, in order to reduce or eliminate the vortical re-circulating flows, a slat-cove filler 23 may be attached to a back side of the conventional leading-edge slat 22. For example, the slat-cove filler 23 may be a slat-cove filler as described in U.S. Pat. No. 9,242,720 which is incorporated herein by reference in its entirety for all purposes.

The slat-cove filler 23 may be formed from a sheet of thin flexible material and fixedly secured to the conventional leading-edge slat 22 at or near both the slat trailing edge 25 and the cusp 26. The slat-cove filler 23 may comprise an elongated element extending along substantially the entire span-wise length of conventional leading-edge slat 22, or it may extend along only a portion or portions of conventional leading-edge slat 22. As the conventional leading-edge slat 22 moves from the deployed position (FIG. 1A) to the retracted position (FIG. 1D), the slat-cove filler 23 is deformed due to contact between the slat-cove filler 23 and leading-edge 24 of primary wing structure 21. The slat-cove filler 23 may be configured to autonomously move from a partially retracted configuration (FIG. 1C) to a more fully or completely deployed configuration (FIGS. 1A and 1B) as the slat-cove filler 23 passes through intermediate configurations. Thus, due to the flexible construction of the slat-cove filler 23, the slat-cove filler 23 may have a first shape S1 when the conventional leading-edge slat 22 is in the deployed position (FIG. 1A) and a second shape S2 when the conventional leading-edge slat 22 is in the retracted position (FIG. 1D). In addition, the slat-cove filler 23 may have a series of intermediate shapes (e.g., FIGS. 1B and 1C) as the conventional leading-edge slat 22 moves relative to the primary wing structure 21 between the deployed and retracted positions.

Figure 1A:
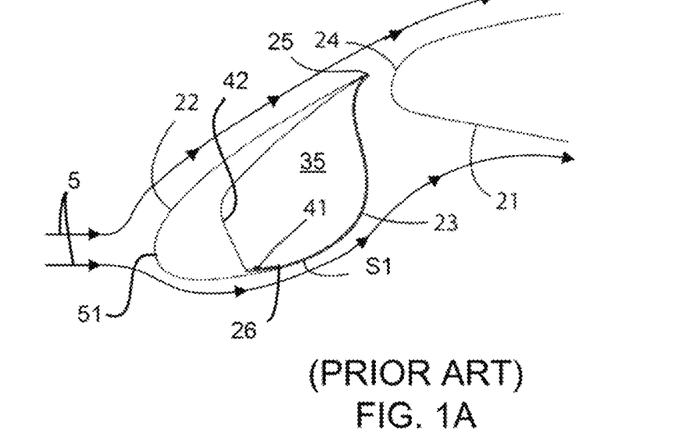
FIG. 1A is a partially fragmentary cross-sectional view of a conventional primary wing structure, leading-edge slat, and slat-cove filler, wherein the leading-edge slat is in a deployed position.

FIG. 1A illustrates the deployed position, in which the conventional leading-edge slat 22 has been moved (e.g., shifted and slightly rotated) downwardly and/or forwardly away from the leading-edge 24 of the primary wing structure 21. The slat-cove filler 23 may be biased to bulge rearwardly toward the primary wing structure 21 and block the flow of air 5 into the cove region 35. For example, a hinge 41, attaching the slat-cove filler 23 to the conventional leading-edge slat 22 at a position near the cusp 26, may encourage the slat-cove filler 23 into the first shape S1. The hinge 41 may have a torsion spring or the like that generates a torque acting on slat-cove filler 23 at the hinge 41. Alternatively, the slat-cove filler 23 itself may generate a leaf-spring force (i.e., restoring force due to strain energy) biasing it toward the deployed position. At least a portion of the slat-cove filler 23 may comprise a super-elastic SMA that enables the slat-cove filler 23 to repeatedly change between the first shape S1 and the second shape S2 due to potentially large deformation required during the change. In the first shape S1, the slat-cove filler 23 includes a smoothly curved convex portion extending rearwardly from the cusp 26 and a concave curved portion adjacent the slat trailing edge 25. The first shape S1 may provide a profile or surface shape that is designed to eliminate unsteady flow between the primary wing structure 21 and the conventional leading-edge slat 22, thus maintaining an attached boundary layer on an outer surface of the slat-cove filler.

Figure 1B:
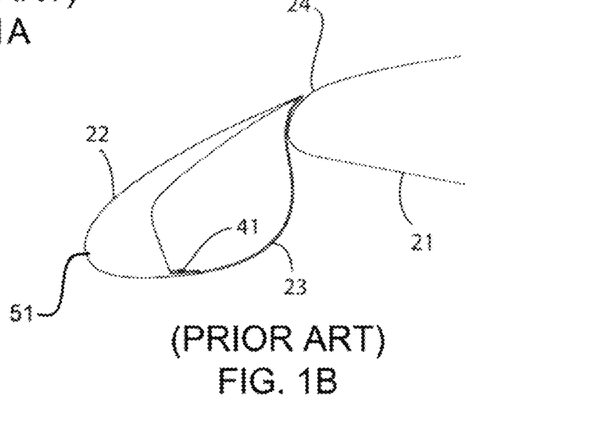
FIG. 1B is a partially fragmentary cross-sectional view of the conventional wing structure, leading-edge slat, and slat-cove filler of FIG. 1A, wherein the leading-edge slat is in a configuration that is between a deployed position and a retracted position.

FIG. 1B illustrates the conventional leading-edge slat 22 moved closer to the leading-edge 24 of the primary wing structure 21, such that the leading-edge 24 starts to contact a trailing end of the slat-cove filler 23. In this way, a portion of the slat-cove filler 23 contacts the primary wing structure 21 as the leading-edge slat moves from the deployed position to the retracted position.

Figure 1C:
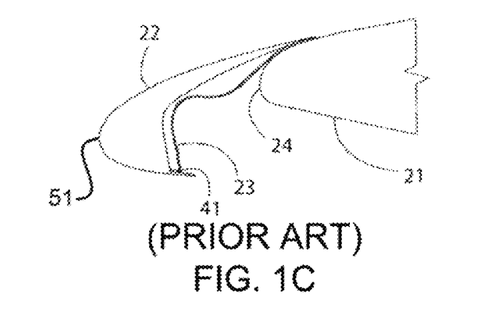
FIG. 1C is a partially fragmentary cross-sectional view of the conventional wing structure, leading-edge slat, and slat-cove filler of FIGS. 1A-1B, wherein the leading-edge slat is in a configuration that is intermediate to the position in FIG. 1B and the retracted position.
Figure 1D:
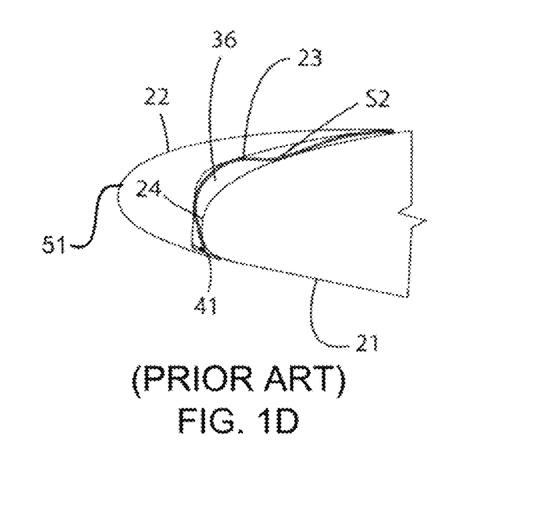
FIG. 1D is a partially fragmentary cross-sectional view of the conventional wing structure, leading-edge slat, and slat-cove filler of FIGS. 1A-1C, wherein the leading-edge slat is in the retracted position.

FIG. 1C illustrates the conventional leading-edge slat 22 moved even closer to the leading-edge 24 of the primary wing structure 21, such that the leading-edge 24 has deformed the slat-cove filler 23. The contact of the slat-cove filler 23 with the primary wing structure 21 causes the slat-cove filler 23 to change from the first shape S1 to the second shape S2. Depending on the type of material(s) used to form the slat-cove filler 23 and on details of the integration of the slat-cove filler 23 with the slat 22, the shape of the slat-cove filler 23 and the deformation therein may vary at intermediate stages of retraction. Similarly, the shape of the slat-cove filler 23 and the deformation therein may vary slightly in second shape S2, depending on material selection and structural integration details.

FIG. 1D illustrates the retracted position, in which the leading-edge 24 of the primary wing structure 21 is positioned directly adjacent to the conventional leading-edge slat 22 and nested in a cove region 36 thereof. In the retracted position, the leading-edge 24 is positioned directly adjacent to and nested in a cove region 36 of the conventional leading-edge slat 22.

The length of the slat-cove filler 23 and the curvature of the first shape S1 may be designed with aerodynamic considerations, such as to provide more steady or laminar flow under the conventional leading-edge slat 22. However, in the retracted position the slat-cove filler 23 as well as the front of the primary wing structure 21 must fit into the cove region 35. While shorter slat-cove fillers may stow easily, longer slat-cove fillers may not fit in the cove region 35. Thus, conventional slat-cove fillers may be restricted from having an optimal first shape in order to ensure a properly retracted position can be achieved between the primary wing structure and the leading-edge slat.

The systems, methods, and devices of the various embodiments may address the short-comings in previous slat-cove fillers and may achieve practical implementation of noise reduction for leading-edge slats. Various embodiments may provide advancements in slat-cove fillers and various embodiments may be applicable to any aircraft that employs a leading-edge, high lift device that is distinct from the primary wing structure.

Various embodiments promote a tight nesting between the leading-edge slat and the primary wing structure in the retracted position. In this way, any geometric discontinuity, such as a backward-facing step, is minimized to achieve a clean cruise geometry. Little to no clearance is typically preferred between a trailing edge of a leading-edge slat (hereinafter referred to as a "slat trailing edge") and the outer surfaces of the primary wing structure when the leading-edge slat is in the retracted position (i.e., a stowed configuration). Additionally, there is generally very little space to stow the bulk of a slat-cove filler behind the leading-edge slat in the retracted position, up against the primary wing structure. Thus, various embodiments provide modifications to the leading-edge slat that includes a sliding-flexure hinge and a sliding slat-cove filler.

Various embodiments avoid significant variation across the span-wise sections of the various leading-edge slats or compromises in the slat-cove filler profile by shortening the effective curvilinear length of the slat-cove filler when stowed while enabling the stowage of an optimized slat-cove filler having a large actual curvilinear length. In particular, various embodiments add sliding kinematics between the leading-edge stat and the slat-cove filler to reduce the effective curvilinear length of the slat-cove filler when stowed.

Various embodiments take advantage of contact forces between the primary wing structure and the slat-cove filler, which in the early stages of leading-edge slat retraction tend to push the slat-cove filler toward the leading-edge of the leading-edge slat. Additionally, there is room within the body of the leading-edge slat in which to stow excess material and keep it out of the air flow.

Various embodiments provide a sliding-flexure-hinge at the bottom of the leading-edge slat-cove wall that allows the slat-cove filler to slide under a bulbous base structure. The bulbous base structure may be circular or have a curvature distribution that promotes a desired combination of sliding and bending of the slate-cove filler. In addition, the bulbous base structure may minimize strain in the slat-cove filler as it bends around the bulbous base when being stowed. One end of the slat-cove filler may be in sliding engagement with the leading-edge slat at the cusp, with enough space under or through the bulbous base structure to allow the slat-cove filler to be readily pushed past the base of the slat-cove wall.

FIGS. 2A-2D illustrate an isometric view of a portion of a primary wing structure 21, a leading-edge slat 100 with a sliding-flexure-hinge 155, and a sliding slat-cove filler 200 in various positions, in accordance with various embodiments. In the orientation shown in FIGS. 2A-2D, air flows from left to right (e.g., against a direction of flight), such that a forward direction of the primary wing structure 21, the leading-edge slat 100 and the sliding slat-cove filler faces left and a rearward direction faces right.

In accordance with various embodiments, the leading-edge slat 100 is configured to movably interconnect with the primary wing structure 21 for movement from a retracted position (FIG. 2C) to a deployed position (FIG. 2A) and vice versa. The leading-edge slat 100 may be movably interconnected with the primary wing structure 21 by various mechanisms. The mechanisms may deploy or retract the leading-edge slat 100 relative to the primary wing structure 21 when activated. In the retracted position, the leading-edge slat 100 is positioned closer to a leading-edge 24 of the primary wing structure 21 than in the deployed position. The leading-edge slat 100 includes an upper surface 112, a lower surface 118, and a cove wall 150 extending between the upper and lower surfaces 112, 118. The upper surface 112 extends rearwardly toward the primary wing structure 21 from a leading edge 101 to a slat trailing edge 109. The lower surface 118 extends rearwardly from the leading edge 101 to a cusp 130.

In various embodiments, the leading-edge slat 100 may be configured such that a gap may be formed between the sliding-flexure-hinge 155 at the base structure of a cove wall 150 and an inner surface just forward of the cusp 130 and opposite a rearward portion of the lower surface 118 of the leading-edge slat 100. The gap may provide access to/from an interior space 250 of the leading-edge slat 100 forward of the cove wall 150 (i.e., interior to the leading-edge slat 100 and between the leading edge 101 and cove wall 150). The gap may be sized to allow a leading end 202 of the sliding slat-cove filler 200 to slide along the inner surface of the leading-edge slat 100 when moving between the retracted and deployed configurations. This sliding movement also slides the sliding slat-cove filler 200 over the cusp 130. The leading end 202 of the slat-cove filler 200 may slide through the gap formed between the sliding-flexure-hinge 155 at the base structure of the cove wall 150 and the inner surface just forward of the cusp 130 to extend and/or retract a portion of the sliding slat-cove filler 200, such as the leading end 202, into/out of the interior space 250 of the leading-edge slat 100. The interior space 250 of the leading-edge slat 100 may be an opening (or cavity) within the leading-edge slat 100 defined forward of the cove wall 150.

FIG. 2A illustrates a deployed position, in which the leading-edge slat 100 has been moved (e.g., shifted and slightly rotated) downwardly and/or forwardly away from the leading-edge 24 of the primary wing structure 21. The sliding slat-cove filler 200 may be formed from a resilient and flexible material that extends between the slat trailing edge 109 and the cusp 130. In addition, the sliding slat-cove filler 200 may comprise an elongated sheet-like element extending along substantially the entire span-wise length of the leading-edge slat 100, or it may extend along only a portion or portions of the leading-edge slat 100. The sliding slat-cove filler 200 may be biased to bulge rearwardly toward the primary wing structure 21 into a deployed shape S11 (i.e., a first shape) and block the flow of air into the cove region 191. The sliding slat-cove filler 200 itself may generate a leaf-spring force (i.e., restoring force due to strain energy) leveraged from the attachment to the slat trailing edge 109, biasing the sliding slat-cove filler 200 into the deployed shape S11. Alternatively, a hinge attaching the slat trailing edge 109 to the sliding slat-cove filler 200 may encourage the sliding slat-cove filler 200 into the deployed shape S11. The biasing force may be designed to keep the sliding slat-cove filler 200 deployed while under aerodynamic loads. Additional bias force to encourage the sliding slat cove filler 200 to maintain the deployed shape S11 against aerodynamic loads may be achieved by an optional bias element 217 or 219 (shown in FIG. 2D), such as a spring or similar provision, at the leading end 202 of the sliding slat-cove filler 200. As an example, the bias element may be a constant force spring pushing (e.g., bias element 219) or pulling (e.g., bias element 217) against the leading end 202 of the sliding slat-cove filler 200 to apply bias force to encourage the sliding slat cove filler 200 to maintain the deployed shape S11 against aerodynamic loads. As a specific example, the bias element 217 may be a coiled-strip spring pulling on the leading end 202 and applying constant force or constant torque attached to the inside of the cove wall 150 at its base so as to not interfere with the slat-cove filler 200 movement into the interior space 250. As another example, the bias element 219 may be a spring attached to the inside of the leading edge 101 and pushing on the leading end 202 with constant force. In some embodiments, only a single bias element, such as bias element 217 or bias element 219 may be provided to apply force to the leading end 202. In other embodiments, more than one bias element, such as bias element 217 and bias element 219 or any other type bias element, may be provided to apply force to the leading end 202. The leading end 202 of the sliding slat-cove filler 200 may also include a mechanical stop 210, which prevents the leading end 202 from sliding rearwardly past the sliding-flexure-hinge 155 at the base of the cove wall 150. The bias element 217 or 219 and mechanical stop 210 at the leading end 202 of the sliding slat-cove filler 200 may be integrated together. For example, the bias element 219 may be configured to apply the bias force to the mechanical stop 210 to thereby encourage the sliding slat cove filler 200 to maintain the deployed shape S11 against aerodynamic loads. In the deployed shape S11, the sliding slat-cove filler 200 may include a smoothly curved convex portion extending rearwardly from the cusp 130 and a concave curved portion adjacent the slat trailing edge 109. The bias element 217 or 219 may be configured such that the constant force/torque applied by the bias element 217 or 219 to the slat-cove filler 200 leading end 202 and/or the mechanical stop 210 may keep the slat-cove filler 200 deployed when the leading-edge slat 100 is deployed but not increase as the slat-cover filler 200 extends into the interior space 250 during leading-edge slat 100 retraction. In this manner, the bias may only be that required to keep the slat-cove filler 200 from collapsing under aero-load and minimal additional force may be needed to stow the slat-cove filler when the leading-edge slat 100 retracts. The deployed shape S11 may provide a profile or surface shape that is designed to eliminate unsteady flow between the primary wing structure 21 and the leading-edge slat 100, thus maintaining an attached boundary layer on an outer surface of the sliding slat-cove filler 200.

FIG. 2B illustrates the leading-edge slat 100 moved closer to the leading-edge 24 of the primary wing structure 21, such that the leading-edge 24 starts to contact and push on a trailing end of the sliding slat-cove filler 200. In this way, a portion of the sliding slat-cove filler 200 may be pushed past and between the sliding-flexure-hinge 155 and the inner surface of the leading-edge slat 100 just forward of the cusp 130. As such, when the leading-edge slat 100 is moving toward a retracted position (FIG. 2C), the leading end 202 of the sliding slat-cove filler 200 may slide along the underside of the sliding-flexure-hinge 155 through the gap under the sliding-flexure-hinge 155 and into the interior space 250 of the leading-edge slat 100, reducing the length of the sliding slat-cove filler 200 extending rearward from the sliding-flexure-hinge 155 as compared to the deployed position (FIG. 2A) of the leading-edge slat 100. As the remaining length of the sliding slat-cove filler 200 rearward of the sliding-flexure-hinge 155 is now less than it was in the deployed configuration, the exposed or effective length of the sliding slat-cove filler 200 is commensurate with the reduced cove region 192 between the cove wall 150 and the leading edge 24 of the primary wing structure 21, which is also smaller than it was in the deployed configuration.

FIG. 2C illustrates the leading-edge slat 100 in the retracted position, such that the leading-edge 24 has pushed and deformed the sliding slat-cove filler 200 into a retracted shape S12 (i.e., a second shape). In the retracted shape S12, the sliding slat-cove filler 200 may extend even further forward of the sliding-flexure-hinge 155, bend around the base of the sliding-flexure-hinge 155, and then nominally follows the contour of the leading-edge 24 of the primary wing structure 21 up to the slat trailing edge 109. As the remaining length of the sliding slat-cove filler 200 rearward of the sliding-flexure-hinge 155 is now even less than it was in FIG. 2B, the exposed or effective length of the sliding slat-cove filler 200 is commensurate with the fully reduced cove region 193 between the cove wall 150 and the leading edge 24 of the primary wing structure 21, which is also even smaller. The resilient and flexible construction of sliding slat-cove filler 200 combined with the ability to at least partially slide past the base of the cove wall 150 (i.e., through the gap between the sliding-flexure-hinge 155 and the inner surface just forward of the cusp 130) allows the remaining portions of the sliding slat-cove filler 200 to fit in the fully reduced cove region 193 between the leading-edge 24 of the primary wing structure 21 and the cove wall 150. At least a portion of the slat-cove filler 200 may comprise a super-elastic SMA that enables the slat-cove filler 200 to repeatedly change between the deployed shape S11 and the retracted shape S12 due to potentially large deformation required during the change.

In accordance with various embodiments, in addition to being configured to partially stow inside the interior space 250 within the leading-edge slat 100, the sliding slat-cove filler 200 may be configured to autonomously move back from a fully retracted configuration (FIG. 2C) or a partially retracted configuration (FIG. 2B) to a more fully or completely deployed configuration (FIG. 2A). As such, the leading end 202 of the sliding slat-cove filler 200 may retract out of the interior space 250 through the gap under the sliding-flexure-hinge 155 until the mechanical stop 210 contacts the sliding-flexure-hinge 155 when the leading-edge slat 100 is moving toward the deployed configuration (FIG. 2A). As the mechanical stop 210 may have a height larger than the gap under the sliding-flexure-hinge 155, the mechanical stop 210 may be held within the interior space 250 by the sliding-flexure-hinge 155 and may prevent the sliding slat-cove filler 200 from disengaging from the leading-edge slat 100.

Figure 3:
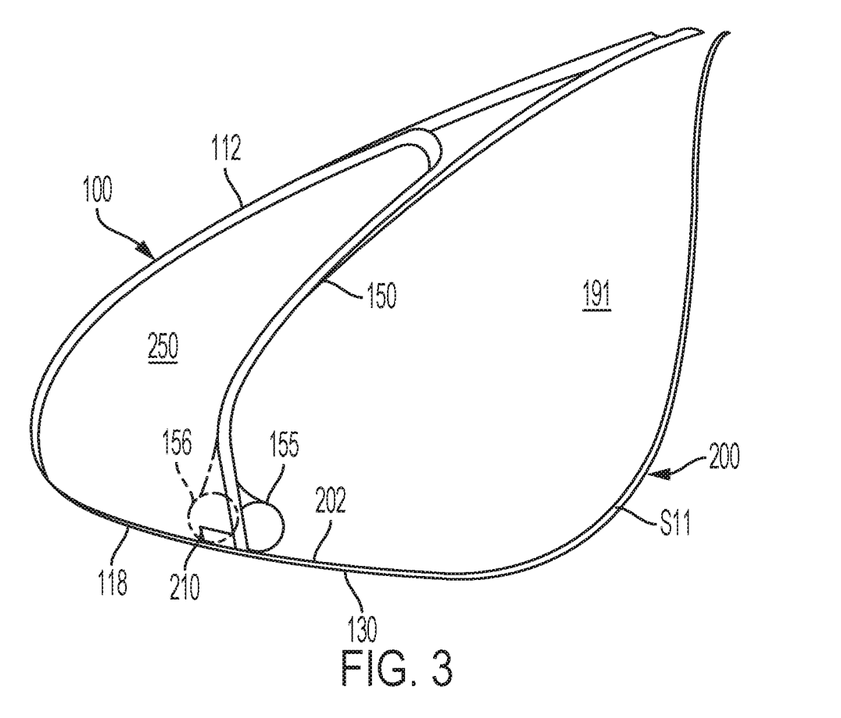
FIG. 3 is a partially fragmentary cross-sectional view of a leading-edge slat with a bulbous sliding-flexure-hinge securing a sliding slat-cove filler that is also attached to a slat trailing edge, in accordance with various embodiments.

FIG. 3 illustrates a leading-edge slat 100 with a bulbous type sliding-flexure-hinge 155 securing the sliding slat-cove filler 200 that is also attached to the slat trailing edge, in accordance with various embodiments. The leading end of the sliding slat-cove filler 200 is constrained to slide along an upward facing surface inside a lower part of the leading-edge slat 100 by the sliding-flexure-hinge 155 forming the base structure of the cove wall 150. The sliding-flexure-hinge 155 may be suspended over the inside lower part of the leading-edge slat 100 at the base of the cove wall 150 such that a gap (e.g., opening) is formed allowing access to the interior space 250. During retraction/deployment, the leading end of the sliding slat-cove filler 200 slides along the sliding-flexure-hinge 155 into/out of the interior space 250 of the leading-edge slat 100. In various embodiments, the sliding-flexure-hinge 155 protrudes rearwardly from the base of the cove wall 150. In particular, the protruding elements of the sliding-flexure-hinge 155 may have a bulbous shape. The shape of the sliding-flexure-hinge 155 may be such that an acceptable strain level is never exceeded in the sliding slat-cove filler 200 as it is bent around the bulbous shape as it enters the retracted configuration. The bulbous shape may protrude rearwardly from the base of the cove wall 150 more or less than that shown in order to adjust the maximum level of strain imparted on the sliding slat-cove filler 200. For example, the bulbous formation may even be positioned as far forward as to be completely embedded (i.e., flush) in the cove wall 150 (shown as sliding-flexure-hinge 156 in phantom dash-dot lines in FIG. 3). FIG. 3 also shows the interaction of the leading end of the sliding slat-cove filler 200, which may include a mechanical stop 210 preventing the leading end from sliding rearwardly past sliding-flexure-hinge 155. Additionally, the sliding slat-cove filler 200 may include a bias element, such as bias element 217 or 219, that encourages the sliding slat-cove filler 200 to maintain a deployed position under aerodynamic loads and that may keep the mechanical stop 210 in its fully deployed position at the sliding-flexure-hinge 155. The bias element and stop 210 may be integrated such as may be achieved with a constant force spring pushing (or pulling) on the stop 210.

Figure 4:
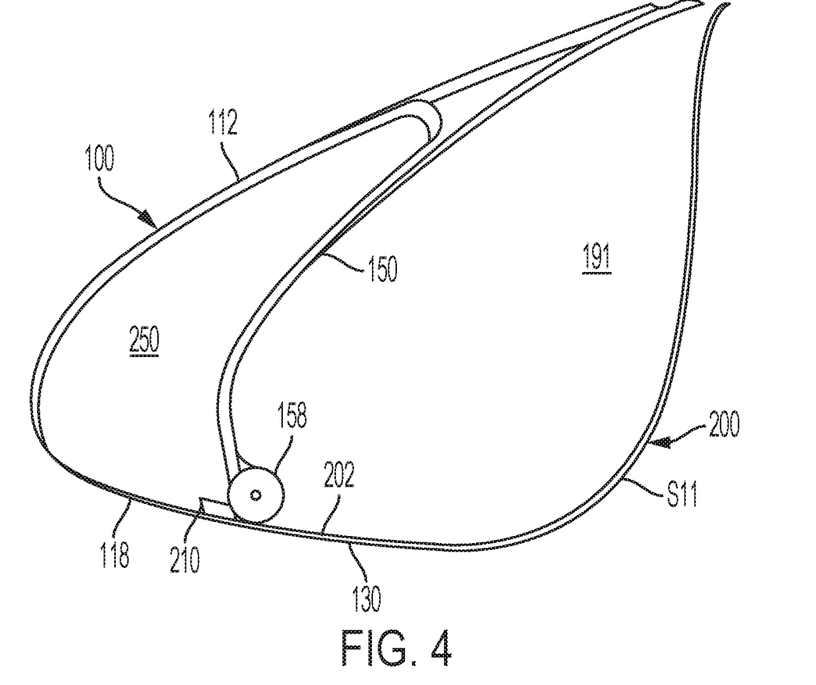
FIG. 4 is a partially fragmentary cross-sectional view of a leading-edge slat with a roller-type sliding-flexure-hinge securing a sliding slat-cove filler that is also attached to a slat trailing edge, in accordance with various embodiments.

FIG. 4 illustrates the leading-edge slat 100 with a roller-type sliding-flexure-hinge 158 securing the sliding slat-cove filler 200, in accordance with various embodiments. The base structure includes at least one roller in rolling engagement with the slat-cove filler 200. The roller-type sliding-flexure-hinge 158 may be suspended over the inside lower part of the leading-edge slat 100 at the base of the cove wall 150 such that a gap (e.g., opening) is formed between the at least one roller and the lower part of the leading-edge slat 100 allowing access to the interior space 250. The size of the gap may be selected to match or nearly match the thickness of the slat-cove filler 200. Contact between the sliding slat-cove filler 200 and the facing surface inside a lower part of the leading-edge slat 100 during retraction will automatically push a length of sliding slat-cove filler 200 along the at least one roller of the roller-type sliding-flexure-hinge 158 and past the cove wall 150 and into the interior space 250 in the slat body, the extent of which may vary with span-wise position. The remaining sliding slat-cove filler 200 chord-wise length that is exposed will bend in unison around the primary wing structure and roller-type sliding-flexure-hinge 158. Rollers may aid in the balance of kinematics and deformation by allowing the sliding slat-cove filler 200 to move freely as needed without binding or jamming. Also, the span-wise variation in the sliding motion could skew the lateral and forward edges of the sliding slat-cove filler 200.

Such skewing motion may be better accommodated by the low-friction interaction of a roller. Like the embedded version of the sliding-flexure-hinge described above (156), the roller-type sliding-flexure-hinge 158 may be positioned further forward and may even be completely embedded (i.e., flush) in the cove wall 150.

Figure 5:
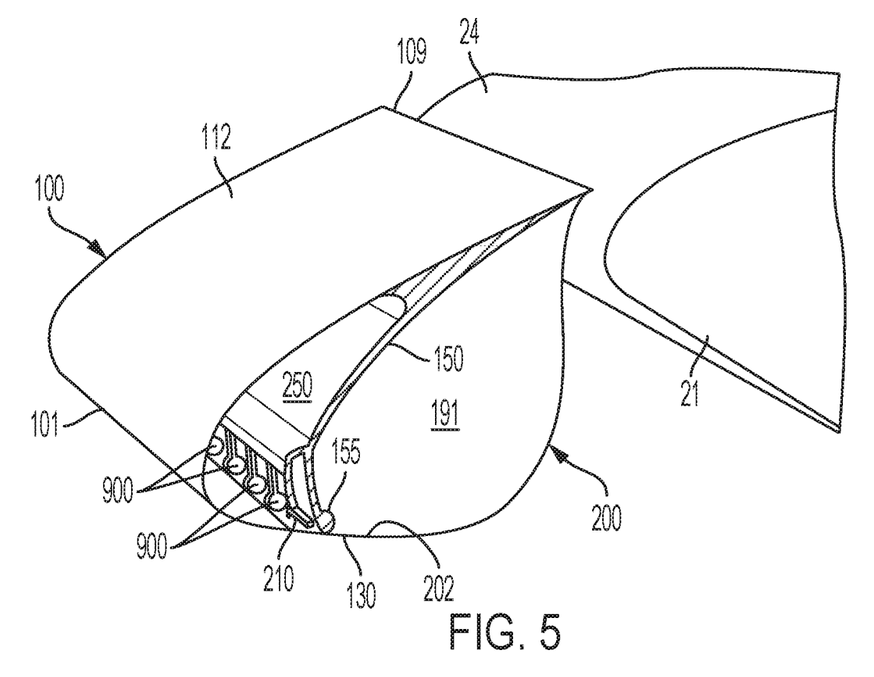
FIG. 5 is a partially fragmentary isometric view of a portion of a primary wing structure, a leading-edge slat, and a slat-cove filler, wherein the leading-edge slat includes a series of tightly spaced stabilizers extending forward of a base structure of a cove wall, in accordance with various embodiments.

FIG. 5 illustrates the primary wing structure 21, the leading-edge slat 100, and the slat-cove filler 200, wherein the leading-edge slat 100 includes at least one stabilizer, such as a series of tightly spaced stabilizers 900, extending forward of the sliding-flexure-hinge 155 of the cove wall 150, in accordance with various embodiments. One or more stabilizers 900 positioned forward of the sliding-flexure-hinge 155 may provide increased constraint and bending rigidity to resist rotation of the forward end of the sliding slat-cove filler 200 when in the deployed configuration and exposed to aerodynamic loads.

The series of tightly spaced stabilizers 900 may comprise of one or more rows of bulbous protrusions and/or rollers suitably placed and shaped so as to hold the leading portions of the sliding slat-cove filler 200 against the inner surface of the lower portion of the leading-edge slat. The series of tightly spaced stabilizers 900 may provide a second row of bulbous protrusions and/or rollers forward of the sliding-flexure-hinge 155, which may be formed as a first row of bulbous protrusions and/or rollers. In some embodiments, the series of tightly spaced stabilizers 900 may be staggered (i.e., in a zigzag order so they are not aligned in a chord-wise direction) relative to the series of elements forming the sliding-flexure-hinge 155. The series of tightly spaced stabilizers 900 is configured to engage the sliding slat-cove filler 200 on a forward surface thereof that is offset in a chord-wise direction from a rearward surface of the sliding slat-cove filler 200 engaged by the sliding-flexure-hinge 155. The spacing between the forward and aft bulb/roller rows may be kept to a minimum to reduce the chord-wise length of sliding slat-cove filler 200 that is entrapped in the sliding constraint in the deployed configuration so that the amount of travel and stowage capacity is maximized when retracted. Similar to the gap formed under the elements of the sliding-flexure hinge 155, gaps may be formed under the stabilizers 900 to allow the sliding slat-cove filler 200 to slide into and out of the interior space 250.

In various embodiments, the bulbs/rollers forming the sliding-flexure-hinge 155 may have a larger and variable radius of curvature to increase mobility of the sliding slat-cove filler 200, particularly as it assumes an inclined orientation to the cove wall 150 due to contact with the primary wing structure 21, and facilitate ingress in and egress from the inner regions of the leading-edge slat 100 throughout the stowage process as sliding and bending continuously adjust to satisfy equilibrium as necessary.

Figure 6:
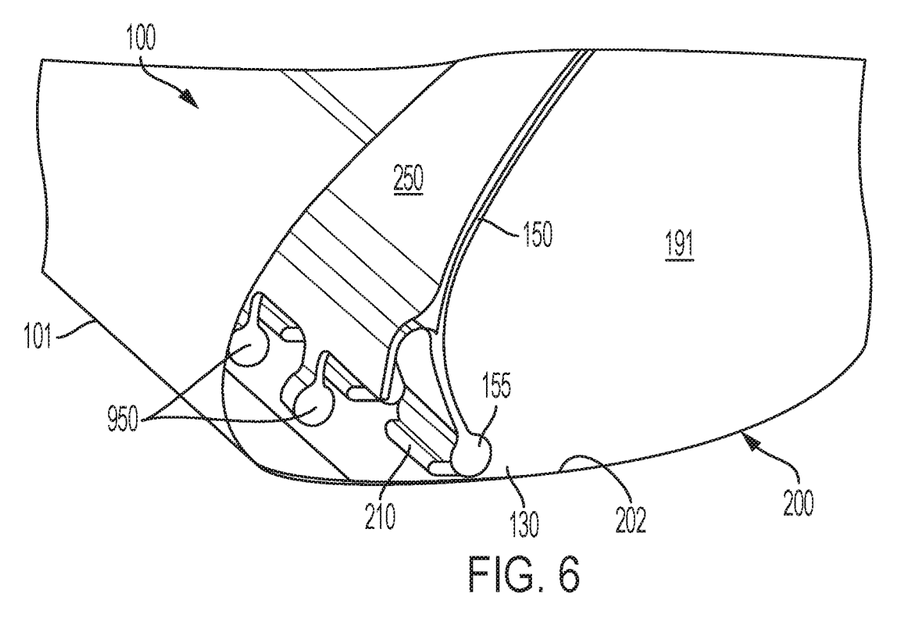
FIG. 6 is a partially fragmentary isometric close-up view of a portion of a leading-edge slat and a slat-cove filler, wherein the leading-edge slat includes a series of loosely spaced stabilizers extending forward of a base structure of a cove wall, in accordance with various embodiments.

FIG. 6 illustrates a portion of a leading-edge slat 100 and a sliding slat-cove filler 200, wherein the leading-edge slat 100 includes a series of loosely spaced stabilizers 950 extending forward of the sliding-flexure-hinge 155 of the cove wall 150, in accordance with various embodiments. The series of loosely spaced stabilizers 950 demonstrate that the size, spacing, and relative locations of such stabilizers may be changed to accommodate particular regional conditions and/or special characteristics of an aircraft or airfoil. The loosely spaced stabilizers 950 may be variations of the stabilizers 900 described with reference to FIG. 5. As shown in FIG. 6, spaces in the mechanical stop 210 may allow the sliding slat-cove filler 200 to slide reward past the stabilizers 900, 950 while still mechanically engaging with the sliding-flexure-hinge 155 to stop rearward travel of the sliding slat-cove filler 200. A forward bias element, such as a constant force spring, may also be integrated with the mechanical stop to aid the system in maintaining the deployed configuration against aerodynamic loads.

Figure 7:
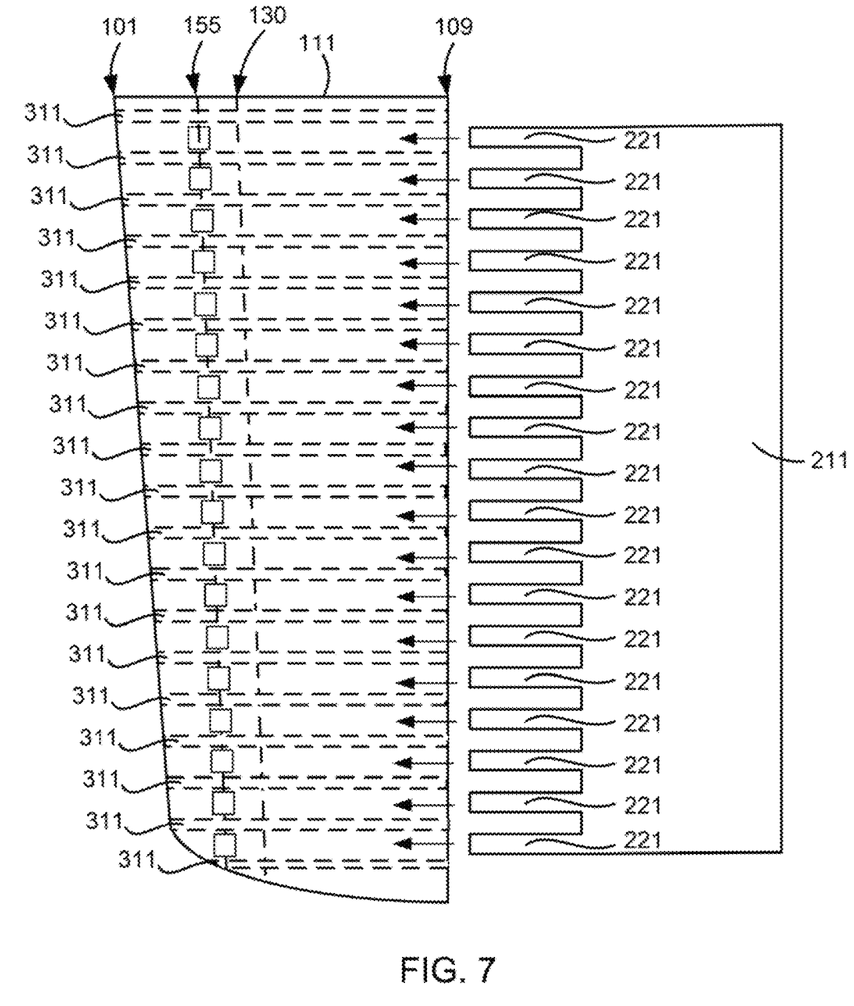
FIG. 7 a partially fragmentary plan view of a leading-edge slat separated from a sliding slat-cove filler configured with tongues to avoid interference with a rib structure of the leading-edge slat, in accordance with various embodiments.

FIG. 7 illustrates a planform view of leading-edge slat segment 111 separated from a sliding slat-cove filler 211 configured with tongues 221 to avoid interference with a series of ribs 311 supporting the leading-edge slat segment 111, in accordance with various embodiments. Often the leading-edge slat segment 111 may include a series of ribs 311 extending in the forward-aft direction in each slat segment that define the outer mold line for the skin of the leading-edge slat segment 111. The rib spacing might be smaller than that shown in FIG. 7 for modern aircraft and/or it might be increased with modern aircraft materials, e.g., composites, or construction techniques, e.g., sandwich-type structure for skin, etc. It is envisioned that the gap under each of the sliding-flexure-hinges 155 (i.e., at the base of the slat-cove wall), may exist between each pair of ribs 311. In accordance with various embodiments, the sliding slat-cove filler 211 may maintain structural continuity over the slat span and slide as desired under each of the sliding-flexure-hinges 155 by shaping a leading-end of the sliding slat-cove filler 211 with tongues 221 that may be inserted into the gaps between each pair of ribs 311 and cutouts between the tongues 221 that allow the sliding slat-cove filler to avoid interference with the ribs during movement between the deployed and retracted configurations. Each cutout may only need to be as long (chord-wise) as the sliding movement at that span-wise location requires. The cutout length at a given span-wise station may be totally or partly hidden from the flow of air by the cusp 130. Any cutout length that protrudes past the cusp 130 in the deployed configuration, and is thus exposed to flow, may be filled with a brush seal or other treatment. It might also be possible to adjust the chord-wise position of the slat-cove-wall slightly to adjust the ratio of slat-interior volume to cusp tang length in order to balance sliding slat-cove filler 211 stowage and cutout shielding lengths as a function of span-wise position.

Rollers or appropriately shaped bulb(s) at the base of the sliding-flexure-hinges 155, 156, 158 may aid in this balance of kinematics and deformation by allowing the sliding slat-cove filler 211 to freely move as needed without binding or jamming. Also, the span-wise variation in the sliding motion could skew the lateral and forward edges of the sliding slat-cove filler 211. The width of the sliding slat-cove filler 211 cutouts may be defined by the span-wise dimension of the ribs 311 and by incorporating sliding-motion skewness to prevent the tongues 221 from contacting the ribs 311.

Figure 8:
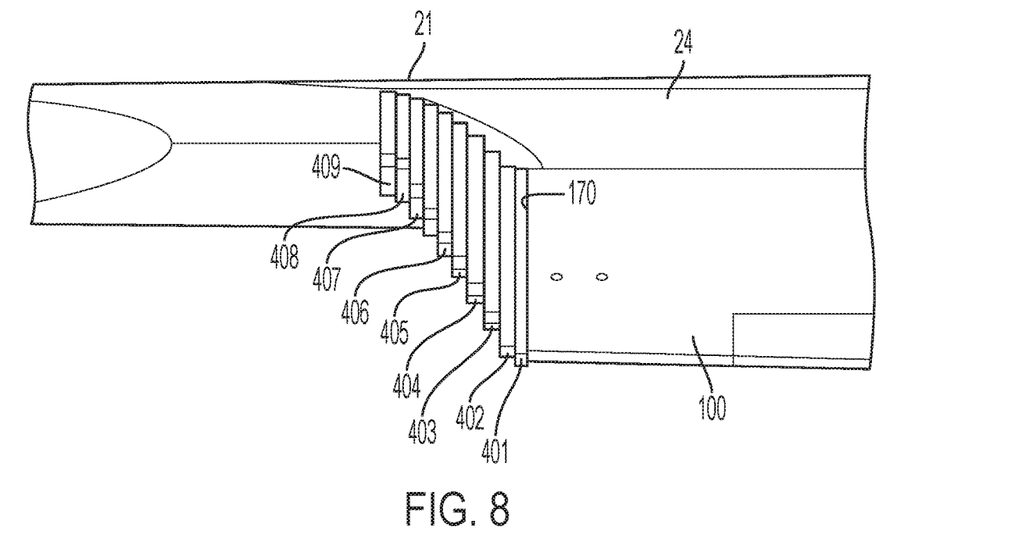
FIG. 8 is a front view of a leading-edge slat in a deployed configuration with a set of nesting side plates enclosing an end of the leading-edge slat to the primary wing structure, in accordance with various embodiments.
Figure 9:
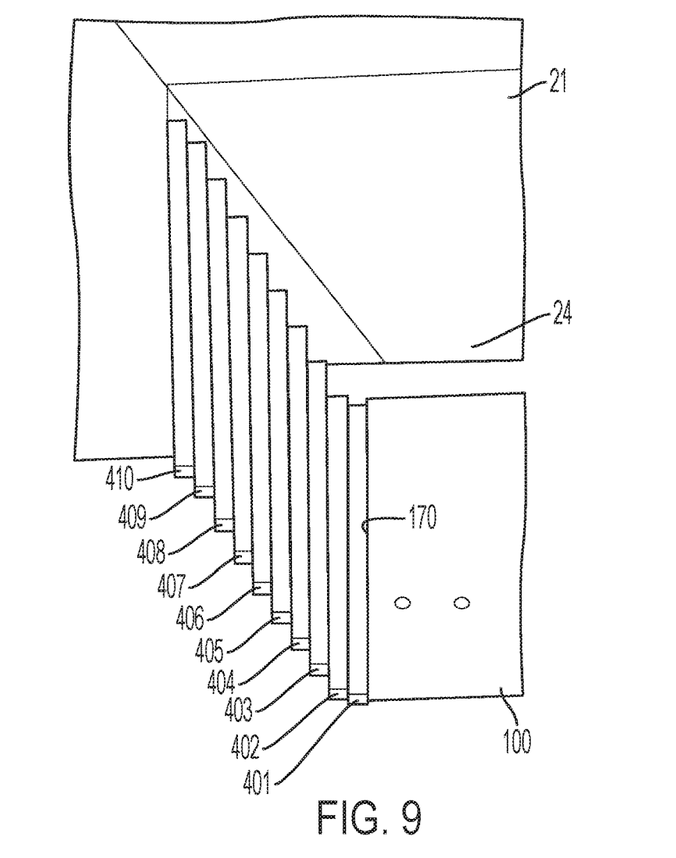
FIG. 9 is a top view of a leading-edge slat in the deployed configuration with the set of nesting side plates in FIG. 8 enclosing then end of the leading-edge slat to the primary wing structure, in accordance with various embodiments.

FIGS. 8 and 9 illustrate a front and top view, respectively, of a leading-edge slat 100 in a deployed configuration with a set of nesting side plates mounted so as to enclose an end of the leading-edge slat to the primary wing structure, in accordance with various embodiments. Various embodiments may include structures for closing the span-wise ends of the leading-edge slats 100, e.g., the lateral edge 170. Closing off the lateral edges of each leading-edge slats with side plates 401-410 may better eliminate known sources of noise. In addition, adding side plates 401-410 to the slat side edges may provide a structural link between each slat side edge and a surface of the primary wing structure 21 that supports the leading-edge slat 100. Similarly, treatment of the sliding slat-cove filler ends may be simultaneously achieved using the side plates 401-410.

A first plate 401, attached to the lateral edge 170, may have a profile of the combined leading-edge slat 100 and the deployed slat-cove filler outer mold line so that the cove region between the sliding slat-cove filler and the slat is enclosed. The cove region may be sealed-off using a rubber bulb seal, brush seal, or other provision. The remaining plates (e.g., 402-410) need not include the profile of the sliding slat-cove filler, but only need to suitably transition from one plate to the next, through to the last plate 410, which is attached to the primary wing structure 21. In this way, edges, gaps, cavities, etc. are minimized to prevent the production of unsteady flow mechanisms. Interlocking slots and pins in the side plates 401-410 may enforce equal movement of each plate. In addition, the throw of each side plates 401-410 may be mechanically programmed to execute sequentially or simultaneously. Additional constraints and load-bearing (lift and drag) capability may be enabled by passing a telescoping rod, or other provision that is secured to the leading-edge slat 100 and primary wing structure, at the ends, through the stack of slide plates 401-410. The aft edge of the first side plate 401, may have the full section of the corresponding leading-edge slat 100 and slat-cove filler profile and may then fit into a matching slot in the leading-edge of the primary wing structure when the leading-edge slat 100 is retracted (i.e., analogous to primary wing structure penetrations for slat actuator and deicing ducting).

Figure 10:
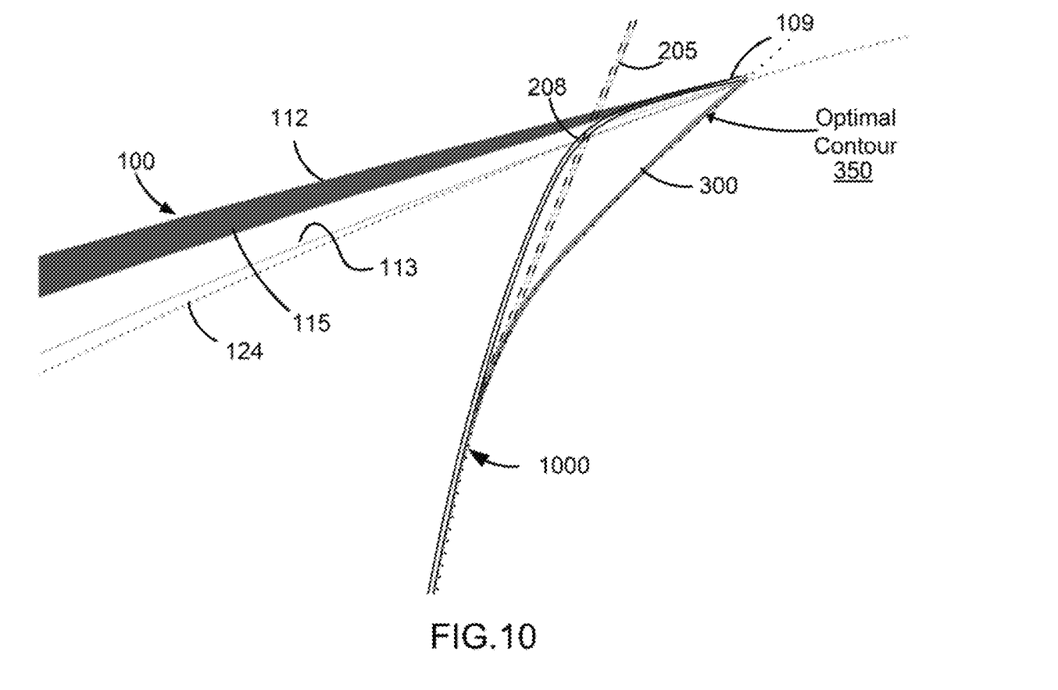
FIG. 10 is a partially fragmentary cross-sectional view of a shape-set trailing end of a sliding slat-cove filler attached to a slat trailing edge along with an external auxiliary slat-cove filler component, in accordance with various embodiments.

FIG. 10 illustrates a shape set trailing end of a slat-cove filler 1000 attached to the slat trailing edge 109 along with an external auxiliary slat-cove filler component 300, in accordance with various embodiments. Slat-cove filler 1000 may be any type slat-cove filler, such as slat-cove filler 23, slat-cove filler 200, slat-cove filler 211, etc. and as such the various embodiments discussed with reference to FIGS. 10-13 may be applied to any type slat-cove filler. FIG. 10 illustrates a portion of the primary wing structure surface 124 in phantom single dashed line. An optimal contour 350 for some slat-cove filler implementations may be a contour that extends from the slat trailing edge 109 away from the cove wall 115 such that the slat-cove filler does not contact the cove wall 115 except at the slat trailing edge 109 in the deployed configuration. An example of such an optimal contour 350 is illustrated with single dotted line in FIG. 10. While optimal contour 350 may be desired in a configuration, a slat-cove filler that follows that optimal contour 350 may not provide an opportunity for a structural joint between the slat-cove filler and the cove wall.

Adding a less-than-optimal contour to the aft-most section 208 of the slat-cove filler 1000 affords the opportunity for a structural joint between the slat-cove filler 1000 and the cove wall 115 near the slat trailing edge 109. The less-than-optimal contour to the aft-most section 208 of the slat-cove filler 1000 may also help maintain a thin slat trailing edge thickness, which allows the slat trailing edge 109 to stow tightly against the primary wing structure surface 124, which is illustrated as the single dashed line in FIG. 10.

In typical configurations, the cove wall may be thicker such that when the leading-edge slat 100 is in the retracted positing it is close to the primary wing structure surface 124 as illustrated by the line for thicker cove wall 113. In various embodiments, the inner cove wall 115 may be formed thinner than in typical configurations, as compared to the thicker cove wall 113, to allow more space that could be used to accommodate the slat-cove filler 1000. The requirement for cove wall modification is more significant for slat-cove filler implementations involving a fixed hinge (e.g., FIGS. 1A-D) because of the greater need to make space for stowing the slat-cove filler of fixed curvilinear length. Cove wall modification requirements are much less significant for a sliding slat-cove filler of the various embodiments and may be limited to making room for the sliding slat-cove filler near the slat trailing edge 109 and making the sliding-flexure-hinge 155.

For a fixed-hinge slat-cove filler implementation, the amount and shape of the re-contoured cove wall 115 may vary with span-wise position and may depend upon the shape of the slat-cove filler profile at any given span-wise position. In general, the curvilinear length of the inner cove wall 115, from the slat trailing edge 109 to the root of the cusp (e.g., just forward of 41 in FIGS. 1A-1D) should be approximately equal to the curvilinear length of the slat-cove filler 1000 that stows from the slat trailing edge 109 to the hinge axis of the slat-cove filler (e.g., 41 in FIGS. 1A-1D). It may be undesirable to have a slat-cove filler 1000 with a curvilinear length that is so short that the slat-cove filler 1000 is pulled taught around the outer mold line of the primary wing structure surface 124 as the leading-edge slat 100 and the slat-cove filler 1000 finish retracting. Additionally, it may not be optimal to have a slat-cove filler 1000 with a curvilinear length significantly exceeding that of the cove wall 115 because, although the slat-cove filler 1000 may stow, excessive force may develop between the leading-edge slat 100 and primary wing structure during stowage.

In accordance with various embodiments, the shape-set trailing end 208 may include a sharpest bend at a chord-wise location offset from the slat trailing edge 109. The sharpest bend may curve more dramatically (i.e., having a smaller curvature radius) just forward of a rearward end of the slat-cove filler 1000.

While the shape of the slat-cove filler 1000 with the shape-set trailing end 208 may afford a structural joint between the slat-cove filler 1000 and the cove wall 115 near the slat trailing edge 109, the shape may not match the optimal contour 350 and the deviation from the optimal contour 350 may prove to be unacceptable in some cases. The external auxiliary slat-cove filler component 300 may extend from the trailing end of the leading-edge slat 100 to a central portion of the slat-cove filler 1000 to cover the sharpest bend and correct for the less-than-optimal contour imparted by the sharpest bend.

In accordance with various embodiments, the external auxiliary slat-cove filler component 300 may be included to provide the desired aerodynamic and aeroacoustic performance lost by using the shape-set aft-most section 208 of the slat-cove filler 1000, i.e., matching an optimized slat-cove filler profile (i.e., optimal contour 350) in the aft-most region near the slat trailing edge 109. A joint between the slat-cove filler 1000 and the forward (i.e., lower) end of the external auxiliary slat-cove filler component 300 may be achieved by fastening, soldering, brazing, welding or by adhesive bonding. The strength and durability of an adhesive bond may be enhanced by appropriate surface preparation (e.g., establishment of a fresh, controlled oxide layer), appropriate surface treatment (e.g., priming) and by proper adhesive selection (e.g., containing silane coupling agents to form a chemical bond).

Although the gauge of the external auxiliary slat-cove filler component 300 is likely to be small because of the small chord-wise extent and relatively light aerodynamic loading there, the configuration shown in FIG. 10 may present a small forward-facing step to the air flow. If necessary, the forward-facing step could be filled with a small sliver of relatively stiff elastomeric material. Alternatively, and also if necessary, the external auxiliary slat-cove filler component 300 could be tapered over part or all of the joint with the slat-cove filler 1000 to essentially eliminate any forward-facing step. Tapering could be accomplished by grinding or electric discharge machining. Tapering and joining the external auxiliary slat-cove filler component 300 may involve heating that could locally affect the heat treatment, composition and super-elastic properties of SMA materials in that vicinity. However, the joint between the slat-cove filler 1000 and external auxiliary slat-cove filler component 300 is in a region that does not typically experience high strain during slat retraction and slat-cove filler 1000 stowage. Thus, retention of super-elastic properties in that region of the slat-cove filler 1000 may not be paramount. Furthermore, the geometry and boundary conditions for the external auxiliary slat-cove filler component 300 may be such that large deformations are not anticipated and usage of a super-elastic SMA material is likely not required in many cases.

Aeroelastic stability and aerodynamic load-bearing capability of the external auxiliary slat-cove filler component 300 may be increased, if needed, by forming it in a stress-free shape, such as that indicated by the dot-dash phantom lines in FIG. 10 so that the external auxiliary slat-cove filler component 300 attains the optimal contour 350 by preloading it during joining/installation. The preload should be sufficient to keep the external auxiliary slat-cove filler component in contact with the slat trailing end and enable it to sustain the local aerodynamic load there, but not so much that it significantly loads the main slat-cove filler 1000 and affects the profile geometry. Alternatively, in the event that greater preload is required for the external auxiliary slat-cove filler component 300, the stress-free profile of the main slat-cove filler 1000 can be adjusted to take the preload into account.

Figure 11:
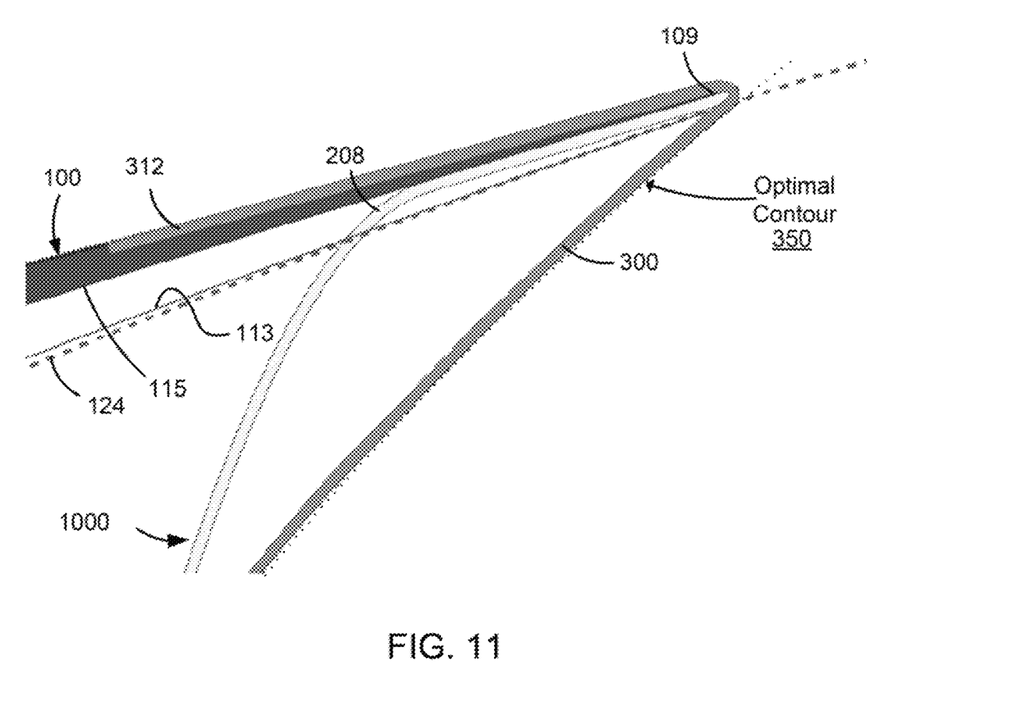
FIG. 11 is a partially fragmentary close-up cross-sectional view of a shape-set trailing end of a sliding slat-cove filler attached to a slat trailing edge along with an external auxiliary slat-cove filler component attached with a lap joint, in accordance with various embodiments.

FIG. 11 illustrates a slat-cove filler 1000 attached to a slat trailing edge 109 along with an external auxiliary slat-cove filler component 300 attached with a lap joint, in accordance with various embodiments. The external auxiliary slat-cove filler component 300 may be wrapped around (i.e., doubled-back upstream) the slat trailing edge 109, and folded over onto a top surface of the leading-edge slat 100 with an extension tag 312 secured thereto in a lap joint configuration. Further thickness reductions could be achieved by ending the slat-cove filler 1000 forward of the slat trailing edge 109 and/or reducing the length of the tag 312 and the corresponding lap joint.

Figure 12:
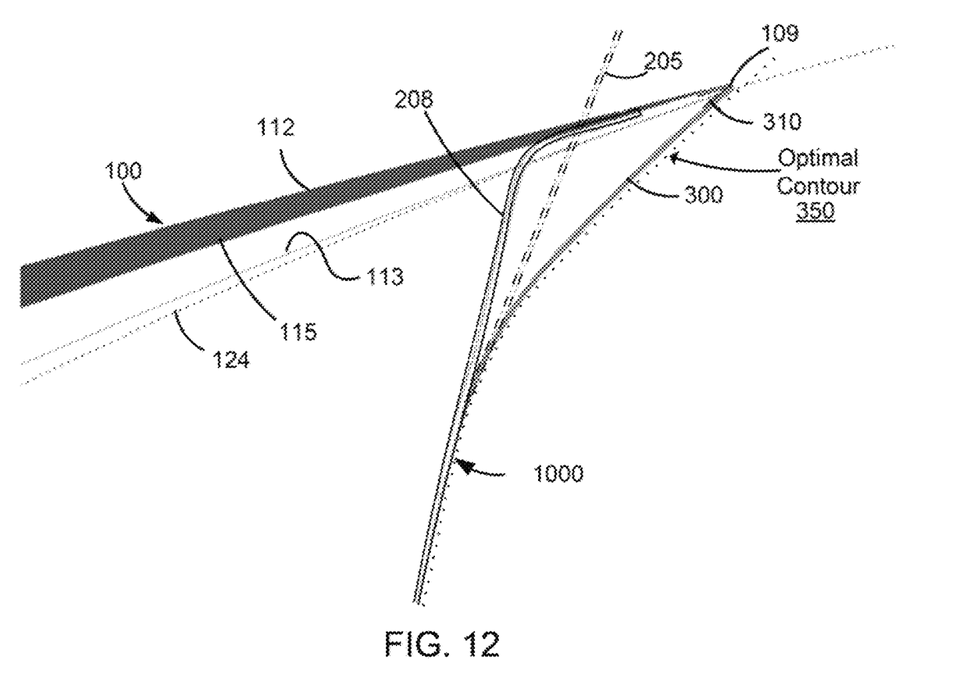
FIG. 12 is a partially fragmentary cross-sectional view of a shape-set trailing end of a sliding slat-cove filler attached to a leading-edge slat forward of a slat trailing edge and an external auxiliary slat-cove filler component attached to the slat trailing edge, in accordance with various embodiments.

FIG. 12 illustrates a shape-set trailing end of a slat-cove filler 1000 attached to a leading-edge slat 100 forward of a slat trailing edge 109 and an external auxiliary slat-cove filler component 300 attached to the slat trailing edge 109 with an aft hinge 310, in accordance with various embodiments. Often, a desirable thickness of the slat-cove filler 1000 needed to sustain expected aerodynamic loads with acceptable deflection may be similar to the desired overall slat trailing edge thickness. In which case, using a slat-cove filler 1000 of requisite thickness for the load that extends to the slat trailing edge 109 will result in an undesirable overall trailing edge thickness. Thus, to achieve a desirable overall trailing edge thickness, a length of the slat-cove filler 1000 may be reduced such that a trailing end thereof terminates forward of the slat trailing edge 109.

As a further alternative, and in accordance with various embodiments, the external auxiliary slat-cove filler component 300 may be attached to the slat trailing edge 109 using the aft hinge 310. In some environments, the external auxiliary slat-cove filler component 300 may tend to depart from the slat trailing edge 109 during stowage and come to nest somewhere forward of the slat trailing edge 109 at full retraction. This behavior may not be of significant consequence since the leading-edge slat 100 would be in contact with the primary wing structure in the retracted position, such that the flow through the gap would be eliminated. However, attachment of the external auxiliary slat-cove filler component 300 at the slat trailing edge 109 may be achieved via a cloth or other ultra-thin hinge (e.g., the aft hinge 310), which may provide increased stability in the external auxiliary slat-cove filler component 300. The external auxiliary slat-cove filler component 300 may be fixedly attached at a central portion of the slat-cove filler 1000 to cover the sharpest bend and correct for the less-than-optimal contour imparted by the sharpest bend.

Figure 13:
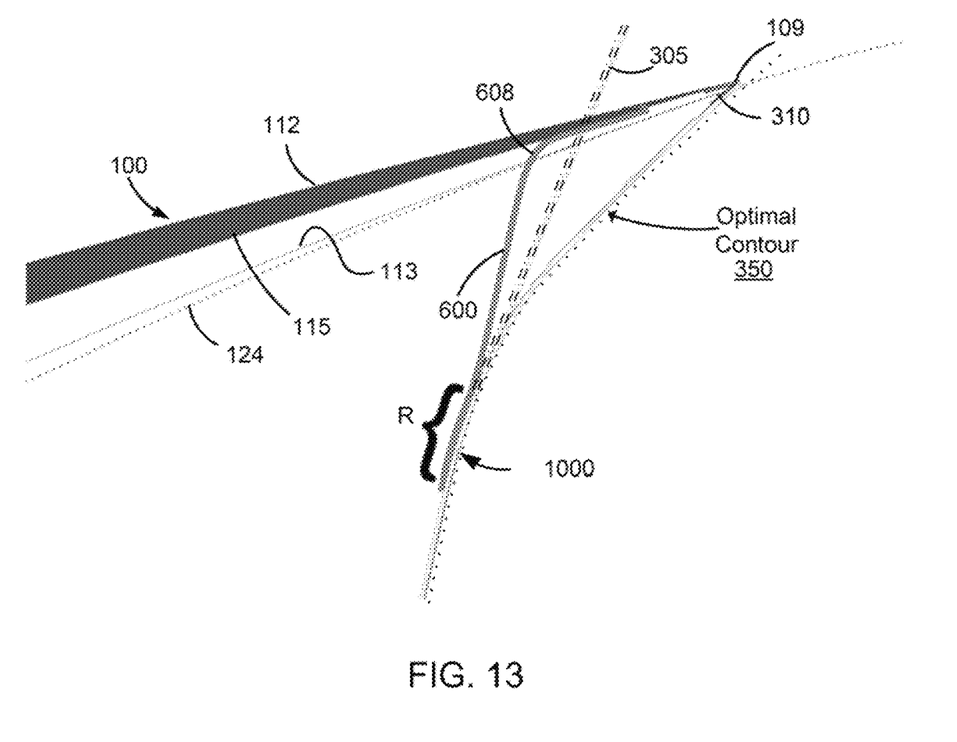
FIG. 13 is a partially fragmentary cross-sectional view of a sliding slat-cove filler attached to a slat trailing edge with an internal auxiliary slat-cove filler component having a shape-set portion attached to a leading-edge slat forward of a slat trailing edge, in accordance with various embodiments.

FIG. 13 illustrates a slat-cove filler 1000 attached to the slat trailing edge 109 with an internal auxiliary slat-cove filler component 600 having a shape-set portion 608 attached to the leading-edge slat 100 forward of a slat trailing edge 109, in accordance with various embodiments. The internal auxiliary slat-cove filler component 600 may be disposed between the slat-cove filler 1000 and the cove wall 115. In this embodiment, the roles of the aft section parts of the slat-cove filler and the auxiliary slat-cove filler component have been swapped from those discussed above with reference to FIGS. 10-12. The slat-cove filler 1000 may follow an optimized slat-cove filler profile (i.e., optimal contour 350) over its entire length, from the cusp to the slat trailing edge 109. In contrast, the internal auxiliary slat-cove filler component 600 may be joined to the slat-cove filler 1000 in a region R that does not experience high strain during the slat retraction/slat-cove-filler stowage process to minimize the influence of the joint on the slat-cove filler 1000 stowage. Because the slat-cove filler 1000 is formed into the optimized slat-cove filler profile (i.e., optimal contour 350) when deployed and hides the internal auxiliary slat-cove filler component 600 from the air flow, the shape of the internal auxiliary slat-cove filler component 600 may only be constrained to suitably attach the slat-cove filler 1000 to the leading-edge slat 100, enable the slat-cove filler 1000 to retain its optimized shape under aerodynamic load, and avoid strain above an acceptable limit during retraction. In this manner, internal auxiliary slat-cove filler component 600 may provide a structural joint between the slat-cove filler 1000 and the cove wall 115. Additionally, and analogous to the above, the internal auxiliary slat-cove filler component 600 may be span-wise discrete because it is hidden from the flow, thereby enabling another parameter to control stiffness and potentially increase mobility of the slat-cove filler 1000 by reducing the coupling between discrete connections of the slat-cove filler 1000 and the slat trailing edge 109.

Analogous to the attachment of the exterior auxiliary slat-cove filler component (300), described above, a joint between the slat-cove filler 1000 and the internal auxiliary slat-cove filler component 600 may be achieved by fastening, soldering, brazing, welding or by adhesive bonding. The strength and durability of an adhesive bond may be enhanced by appropriate surface preparation (e.g., establishment of a fresh, controlled oxide layer), appropriate surface treatment (e.g., priming) and by proper adhesive selection (e.g., containing silane coupling agents to form a chemical bond). The influence of the joint on stowage of the leading-edge slat 100 and the slat-cove filler 1000, i.e., increased thickness and possible reduction in super-elastic capacity, may be minimized by locating the joint in a region of low strain.

Aeroelastic stability and other considerations for the portion of the slat-cove filler 1000 that is above and aft of the joint with the internal auxiliary slat-cove filler component 600 are analogous to those discussed above with regard to FIGS. 10 and 11. Specifically, aeroelastic stability and aerodynamic load-bearing capability could be increased, if needed, in the aft-most section of the slat-cove filler 1000 by forming it in a stress-free shape (indicated as 305 in phantom dot-dash lines in FIG. 13), that attains the optimal contour 350 by preloading it during joining/installation. The preload should be sufficient to keep the aft-most section of the slat-cove filler 1000 in contact with the slat trailing edge 109 and enable it to sustain the local aerodynamic load there, but not so much that it significantly loads the internal auxiliary slat-cove filler 600 and affects the overall profile geometry. Alternatively, in the event that greater preload is required for the aft-most section of the slat-cove filler 1000, the stress-free profile of the internal auxiliary slat-cove filler component 600, and/or the section of slat-cove filler 1000 forward and below the joint with the internal auxiliary slat-cove filler component 600, can be adjusted to take the preload into account.

The slat-cove filler 1000 in configurations like that in FIG. 13 may tend to depart (i.e., pull away) from the slat trailing edge 109 during stowage and come to nest somewhere forward of the trailing end at full retraction. Like before, this behavior may not be significant since the leading-edge slat 100 would be in contact with the primary wing structure in the retracted mode, such that the flow through the gap would be eliminated during that event. However, as described above, the slat-cove filler 1000 may be attached at the slat trailing edge 109 via a cloth or other ultra-thin hinge aft hinge 310. Increased stability in the slat-cove filler 1000 may also be achieved by including the aft hinge 310. The internal auxiliary slat-cove filler component 600 may be fixedly attached at a central portion of the slat-cove filler 1000.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A wing structure for an aircraft, comprising:
   a primary wing structure;
   a leading-edge slat comprising:
      a cove wall;
      a sliding-flexure-hinge extending from the cove wall; and
      an interior space within the leading-edge slat, wherein the leading-edge slat is configured to movably interconnect with the primary wing structure for movement between a retracted position and a deployed position; and
   a slat-cove filler comprising a flexible material and defining a first shape when the leading-edge slat is in the deployed position and a second shape when the leading-edge slat is in the retracted position, wherein a leading end of the slat-cove filler is configured to slide along the sliding-flexure-hinge into the interior space when the leading-edge slat is moving toward the deployed position and out of the interior space when the leading-edge slat is moving toward the retracted position.

2. The wing structure of claim 1, wherein the leading end of the slat-cove filler includes a mechanical stop.

3. The wing structure of claim 2, wherein the sliding-flexure-hinge is a bulbous type sliding-flexure-hinge.

4. The wing structure of claim 2, wherein the sliding-flexure-hinge includes at least one roller in rolling engagement with the slat-cove filler.

5. The wing structure of claim 2, wherein the leading end of the slat-cove filler includes a bias element configured to apply a bias force to the mechanical stop or directly to the leading end of the slat-cove filler itself.

6. The wing structure of claim 1, wherein a stabilizer extends from the cove wall forward of the sliding-flexure-hinge, the stabilizer configured to engage the slat-cove filler.

7. The wing structure of claim 1, wherein the leading-edge slat further comprises a span-wise series of ribs and the slat-cove filler comprises a series of tongues configured to slide between the span-wise series of ribs.

8. The wing structure of claim 1, further comprising:
   at least one side plate mounted on a lateral edge of the leading-edge slat, wherein the at least one side plate includes a profile of a combination of the leading-edge slat and the slat-cove filler.

9. The wing structure of claim 8, wherein the at least one side plate comprises a plurality of nesting side plates.

10. The wing structure of claim 1, wherein the slat-cove filler includes a shape-set trailing end attached to a trailing edge of the leading-edge slat, the shape-set trailing end having a sharpest bend at a chord-wise location offset from the trailing edge of the leading-edge slat.

11. The wing structure of claim 10, further comprising:
    an external auxiliary slat-cove filler component extending between the trailing edge of the leading-edge slat and a central portion of the slat-cove filler below the sharpest bend.

12. The wing structure of claim 11, wherein a forward end of the external auxiliary slat-cove filler component is fixedly secured to the central portion of the slat-cove filler and a rearward end of the external auxiliary slat-cove filler component engages with at least one of the trailing edge of the leading-edge slat and the shape-set trailing end.

13. The wing structure of claim 1, wherein the slat-cove filler includes a shape-set portion attached to the leading-edge slat forward of a trailing edge of the leading-edge slat, wherein the shape-set portion includes a sharpest bend at a chord-wise location forward of a trailing end of the slat-cove filler.

14. The wing structure of claim 1, further comprising:
    an internal auxiliary slat-cove filler component attached to a central portion of the slat-cove filler and the leading-edge slat, the internal auxiliary slat-cove filler component disposed between the slat-cove filler and the cove wall.

15. The wing structure of claim 1, wherein a trailing end portion of the slat-cove filler is attached to a trailing edge of the leading-edge slat by a hinge.

16. The wing structure of claim 1, wherein the leading end of the slat-cove filler includes a bias element.

* * * * *

UNITED STATES PATENT AND TRADEMARK OFFICE
CERTIFICATE OF CORRECTION

PATENT NO. : 11,001,368 B2
APPLICATION NO. : 16/158595
DATED : May 11, 2021
INVENTOR(S) : Travis L. Turner et al.

Page 1 of 1

It is certified that error appears in the above-identified patent and that said Letters Patent is hereby corrected as shown below:

In the Claims

Column 18, Claim 1 Line 1, change "deployed" to "retracted"

Column 18, Claim 1 Line 2, change "retracted" to "deployed"

Signed and Sealed this
Fourteenth Day of May, 2024

Katherine Kelly Vidal
*Director of the United States Patent and Trademark Office*